Figure 1:
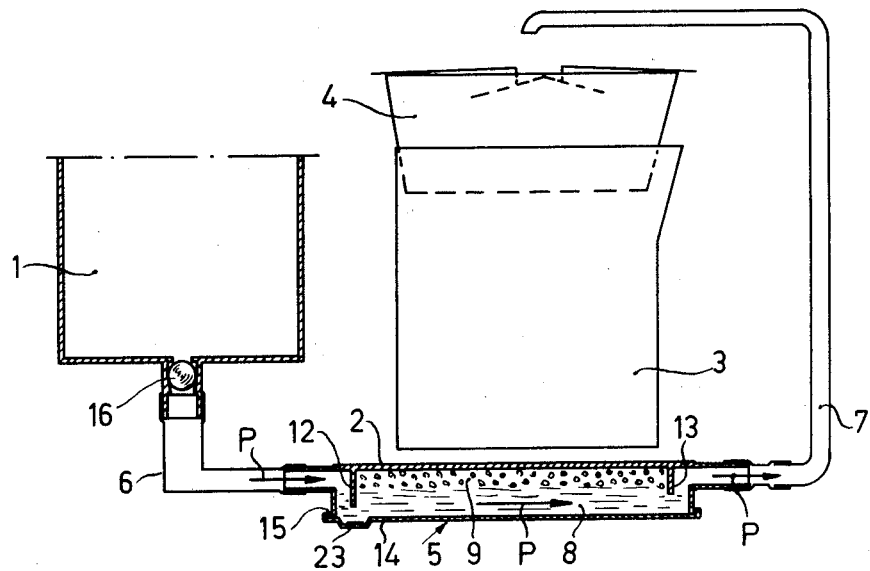

United States Patent

Horn et al.

[15] 3,691,934
[45] Sept. 19, 1972

[54] APPARATUS FOR MAKING COFFEE, TEA AND SIMILAR BEVERAGES

[72] Inventors: Cornelis Jacob Horn; Mindert Kats; Sigibertus Marcelinus Catherinus Van Uffelen, all of Europaweg 8, Groningen, Netherlands

[22] Filed: March 3, 1971

[21] Appl. No.: 120,616

[30] Foreign Application Priority Data

March 25, 1970 Netherlands..............7004246

[52] U.S. Cl.....................................99/290, 99/307
[51] Int. Cl...........................................A47j 31/00
[58] Field of Search........99/307, 293, 294, 290, 288, 99/281, 282, 280, 313, 314

[56] References Cited

UNITED STATES PATENTS

| | | |
|---|---|---|
| 1,852,356 | 4/1932 | Mercier......................99/307 |
| 3,358,583 | 12/1967 | Lepoix........................99/307 |
| 3,371,592 | 3/1968 | Remy..........................99/307 |
| 3,423,209 | 1/1969 | Weber........................99/307 |

Primary Examiner—Robert W. Jenkins
Attorney—Frank R. Trifari

[57] ABSTRACT

An apparatus for making coffee, etc. having a water container and a collecting vessel which are arranged side by side, and a basket for holding ground coffee and the like which is arranged over the collecting vessel. Water is conveyed to the basket through an outlet pipe connected to the container and through a heated water chamber. The invention provides a steam space in the water chamber with the result that the operation of the apparatus is improved, and the problem of fouling, for example, by scale deposition, is reduced.

5 Claims, 4 Drawing Figures

PATENTED SEP 19 1972   3,691,934

INVENTORS
CORNELIS J. HORN
MINDERT KATS
SIGIBERTUS M.C. VAN UFFELEN
BY
Frank R. Trifari
AGENT and similar beverages, which has a water container, a supporting plate for a collecting vessel arranged by the side of the water container and an outlet conduit which is connected to the container and serves to convey the water to a basket for coffee, tea and the like. The basket is arranged over the collecting vessel. Part of the conduit is formed by a water chamber which extends under the supporting plate and is in heat-transfer contact with an electric heating element.

An apparatus of this type is shown, for example, in Dutch Pat. application No. 6,602,268.

The heat produced in the heating element and transferred to the water in the water chamber gives rise to the formation of steam bubbles at several places. As a result of the increase in volume due to the steam generation the water is driven through the outlet conduit to the filter in the form of drops.

Thus the combination of water chamber and heating element also acts as a pump and its operation depends upon critical values such as the dimensions of the water chamber and of the outlet conduit and upon the power of the heating element. In general, satisfactory pump action is obtained only with a small cross-sectional area of the water chamber and of the remainder of the water conduit. A disadvantage is that fouling due, for example, to the deposition of scale, which will usually occur in the water chamber because of the high temperatures produced, may soon interfere with satisfactory operation of the apparatus.

It is an object of the invention to provide a construction which is less dependent on the aforementioned critical values and hence is less liable to fouling by, for example, scale deposition. The apparatus according to the invention is characterized in that the water chamber at its top has a steam space which is bounded by wall parts which extend at right angles to the direction in which the water is conveyed.

A preferred embodiment, in which the water chamber is bent into a substantially U-shaped, the inlet and outlet ends of the water chamber being located at the extremities of the U and being connected to pipe-shaped parts of the water conduit, while a heating element which is also bent into is disposed in contact with the wall of the water chamber, is characterized in that the steam space is bounded by partitions which extend near the ends of the water chamber from the top thereof through part of the cross-sectional area. The partition at the inlet end may extend in the water chamber through a distance greater than that through which the partition at the outlet end extends. To ensure that the flow passage is large enough, the water chamber may have an outwardly projecting bulge formed in its bottom at a point opposite the partition at the inlet end.

An embodiment of favorable construction and effective operation is characterized in that the cross-sectional area of the water chamber is rectangular, the distance between the lower and upper walls being greater than that between the side walls, while the heating element is in contact with one of the side walls at the level of the steam space.

Figure 2:
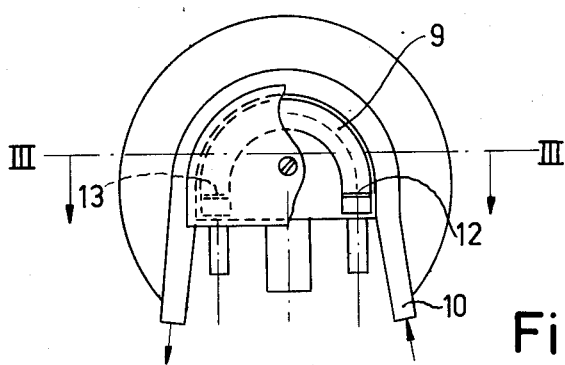
Figure 3:
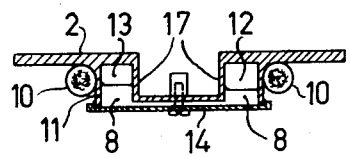
Figure 4:
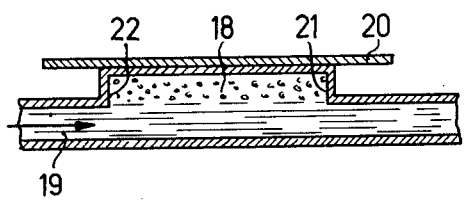

Embodiments of the invention will now be described, by way of example, with reference to the accompanying diagrammatic drawings, in which:

FIG. 1 is a part elevation, part sectional view of an apparatus according to the invention, FIG. 2 is an elevation of a water chamber in a substantially U-shaped form, FIG. 3 is a sectional view taken on the line III—III of FIG. 2, and FIG. 4 shows a modified embodiment of the apparatus shown in FIG. 1.

Referring now to FIG. 1, the apparatus includes a water container 1 and, arranged beside it, a supporting plate 2 for a collecting vessel 3. A filter 4 is placed on the collecting vessel 3 and serves as a basket for the ground coffee or tea leaves. The water is conveyed to the filter through a water conduit including a water chamber 5. The water conduit further comprises a part 6 which connects the water container 1 to the water chamber 5 and a part 7 connected to the water chamber and opening over the filter.

The upper wall of the water chamber 5 forms the supporting plate 2. In FIG. 1, the water chamber 5 is shown as being elongated but in general it will have a curved shape, for example the shape of a U, as is shown in FIGS. 2 and 3. A heating element 10 then will also be bent into the shape of a U, and may be arranged in contact with one of the vertical side walls 11 of the water chamber. The water chamber and the supporting plate may be a moulding accommodating the heating element.

In the embodiment shown in FIGS. 1 to 3, the water chamber has partitions 12 and 13 which extend at right angles to the direction in which the water is conveyed, which is indicated by arrows P. The partition 12 is adjacent the inlet and extends through a larger distance from the upper wall into the water chamber than does the partition 13 adjacent the outlet end. This arrangement has been found to beneficially affect operation. To ensure a sufficiently large flow passage for the water under the partition 12 an outwardly projecting bulge 23 has been formed in the bottom of the water chamber at this point. A steam space 9 is enclosed between the partitions 12 and 13. The heat which is produced by the heating element and is transferred to the water in the water chamber 8 will cause steam generation and this steam will collect in the steam space 9. Further heating will increase the steam volume, with the result that the steam enclosed in the space 9 will act as a piston, so that the part of the water in the water chamber 8 which although heated does not evaporate is pushed through the pipe 7 to the filter 4. Part of the steam will escape together with the water, so that the pressure in the water chamber will be reduced to a value below atmospheric pressure, with consequent supply of cold water from the container. This cold water will produce condensation of the steam, so that the pressure in the water chamber is further reduced and more cold water is supplied to fill up the water chamber. The described process will then repeat itself.

Thus, the steam bubbles, which in the known construction are scattered, will be united, resulting in a more stable and more efficient pump action. However, the more significant advantage is that the increased amount of active steam enables the dimensions of the water chamber to be increased, especially in the transverse direction, so that the fouling problem is steam eliminated. In addition, part of the water or the stream may be held in the steam space during several cycles, and since the impurities contained in this water or in this steam will have been deposited after one or a few cycles, this will also reduce fouling.

At the bottom the water chamber is closed by a removable plate 14, so that the chamber is readily accessible and may easily be cleaned.

Between the water conduit part 6 and the water container 1 is a check valve 16, which in general will improve the operation of the apparatus.

As FIG. 3 shows, the water chamber 8 has a rectangular cross-section, the distance between the lower wall 14 and the upper wall 2 being greater than that between the side wall 11 and 17. As a result, the area of the side walls which is directly heated by the heating element will be comparatively large, which promotes the transfer of heat to the water. It has been found that the best results are obtained when the heating element 10 contacts the water chamber at the level of the steam space 9.

FIG. 4 shows a water chamber in which a steam space 18 is in the form of a part of a water chamber 19 of increased diameter. A supporting plate 20 is arranged above the steam space. In this embodiment also, the steam space is bounded by wall portions 21 and 22.

What is claimed is:

1. An apparatus for making coffee, tea and similar beverages comprising a water container, a supporting plate for a collecting vessel arranged by the side of the water container, an outlet conduit connected to the container for conveying water to a basket for containing ground coffee, tea leaves and the like, said basket being arranged over the collecting vessel, part of the conduit being formed by a water chamber which extends under the supporting plate and is in heat-transfer contact with an electric heating element, a steam space accommodated within said water chamber and bounded by wall portions which extend at right angles to the direction in which the water is conveyed.

2. The apparatus as claimed in claim 1, wherein the water chamber is substantially U-shaped, and the inlet and outlet ends of the water chamber are disposed at the extremities of the U and are connected to pipe-shaped portions of the water conduit, a substantially U-shaped heating element arranged in contact with the wall of the water chamber, said steam space being bounded by partitions which extend from the top of the water chamber through part of the cross-sectional area thereof near its ends.

3. The apparatus as claimed in claim 2 wherein the partitions at the inlet end extends into the water chamber a greater distance than does the partition at the outlet end.

4. The apparatus as claimed in claim 3, further comprising an outwardly projecting bulge formed in the bottom of the water chamber at a point opposite the partition at the inlet end.

5. The apparatus as claimed in claim 1, wherein the water chamber is rectangular in cross-section, the distance between the lower and upper walls being greater than that between the side walls, and wherein the heating element is in contact with one of the side walls at the level of the steam space.

* * * * *

PO-1050
(5/69)

UNITED STATES PATENT OFFICE
CERTIFICATE OF CORRECTION

Patent No. 3691934  Dated Sept. 19, 1972

Inventor(s) CORNELIS JACOB HORN ET AL

It is certified that error appears in the above-identified patent and that said Letters Patent are hereby corrected as shown below:

On The Title Page
Column 1, after "[72] Inventor: Jan Paul Steenmeijer, Hilversum, Netherlands"

should have inserted

--[73] Assignee: U.S. Philips Corporation, New York, N.Y.--

Signed and sealed this  17th  day of April  , 1973.

(SEAL)
Attest:

EDWARD M.FLETCHER,JR.  ROBERT GOTTSCHALK
Attesting Officer  Commissioner of Patents